US008391490B2

(12) United States Patent
Damidaux

(10) Patent No.: US 8,391,490 B2
(45) Date of Patent: Mar. 5, 2013

(54) METHOD PROVIDING THE MEANS FOR RECOGNIZING THE ORIGIN AND/OR CONTENT OF AN RF SIGNAL

(75) Inventor: Jean-Louis Damidaux, Auzielle (FR)

(73) Assignee: Thales, Neuilly sur Seine (FR)

( * ) Notice: Subject to any disclaimer, the term of this patent is extended or adjusted under 35 U.S.C. 154(b) by 353 days.

(21) Appl. No.: 12/675,532

(22) PCT Filed: Sep. 5, 2008

(86) PCT No.: PCT/EP2008/061780
§ 371 (c)(1),
(2), (4) Date: Feb. 26, 2010

(87) PCT Pub. No.: WO2009/037133
PCT Pub. Date: Mar. 26, 2009

(65) Prior Publication Data
US 2010/0303235 A1 Dec. 2, 2010

(30) Foreign Application Priority Data

Sep. 21, 2007 (FR) ...................................... 07 06643

(51) Int. Cl.
H04K 1/00 (2006.01)
(52) U.S. Cl. ........................................................ 380/270
(58) Field of Classification Search ................. 713/176; 380/270, 247, 280, 286; 455/3.02, 3.05
See application file for complete search history.

(56) References Cited

U.S. PATENT DOCUMENTS 7,020,555 B1 3/2006 Janky et al.
7,194,620 B1 3/2007 Hayes
2002/0191809 A1 12/2002 Kirovski et al.
2003/0079131 A1* 4/2003 Reefman ..................... 713/176
2005/0108542 A1* 5/2005 Kirovski et al. ............. 713/176
2006/0075238 A1* 4/2006 Manders et al. ............. 713/176

FOREIGN PATENT DOCUMENTS

EP 1 594 122 A1 11/2005
WO 2004/002160 A1 12/2003

OTHER PUBLICATIONS

Ingemar J. Cox, et al., "Secure Spread Spectrum Watermarking for Multimedia", IEEE Transactions on Image Processing, Dec. 1, 1997, pp. 1673-1687, vol. 6, No. 12, IEEE Service Center, Piscataway, NJ, USA.

* cited by examiner

Primary Examiner — Beemnet Dada
(74) Attorney, Agent, or Firm — Baker & Hostetler LLP

(57) ABSTRACT

The subject of the present invention is a method providing the means for recognizing the origin and/or the content of an RF signal without requiring substantial computation means, these recognition means being accessible only to authorized persons and being practically nonmodifiable and very difficult to detect by unauthorized persons, and this being so in various applications using RF signals transmitting information that is at least partly hidden. This method is characterized in that it spreads an item of information to be hidden with the aid of a hidden code, that it distributes, with the aid of an Exclusive OR function the information thus obtained in codes that are known with the aid of a hidden distribution algorithm, that, on reception, it applies the algorithm that is the inverse of that having served for the distribution in order to gain access to the spread code, that is correlates this spread code with the hidden code in order to find the hidden information.

15 Claims, 1 Drawing Sheet

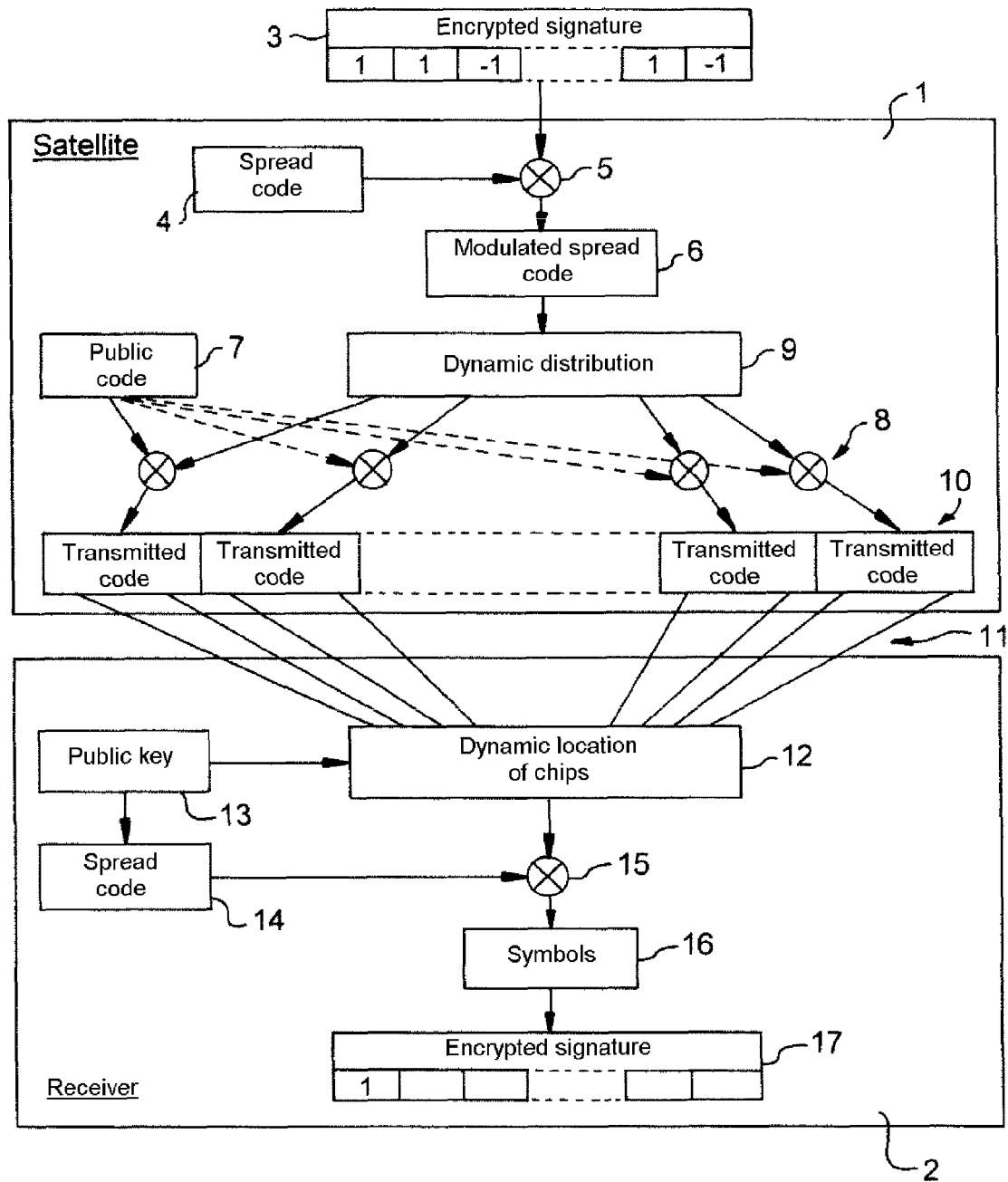

METHOD PROVIDING THE MEANS FOR RECOGNIZING THE ORIGIN AND/OR CONTENT OF AN RF SIGNAL

CROSS-REFERENCE TO RELATED APPLICATIONS

This application is a National Stage of International patent application PCT/EP2008/061780, filed on Sep. 5, 2008, which claims priority to foreign French patent application No. FR 07 06643, filed on Sep. 21, 2007, the disclosures of which are hereby incorporated by reference in their entirety.

BACKGROUND OF THE INVENTION

The present invention relates to a method providing the means for recognizing the origin and/or the content of an RF signal.

Many techniques are known for combating the scrambling of signals such as those of radars. However, in a field such as that of the reception of radiolocation signals, it is necessary to have measures (called pseudomeasures) provided by satellites and ephemeride data. It is relatively easy to protect the ephemeride data in order to guarantee the origin and/or the content thereof. On the other hand, the characteristics of the measurement signals are in the public domain and can therefore not be protected. It is therefore easy to emulate these signals for a user to obtain false geographic position coordinates. The same applies in other fields of digital transmissions such as telecommunications or television programs broadcasts.

Little research has been carried out in order to guarantee the origin of such RF signals. Specifically, it is now possible, if sufficiently powerful computers are used, to produce in an ill-intentioned way signals imitating those transmitted by the geolocation satellites. These deception techniques are called "spoofing".

A few indications in order to try to authenticate the received signals have been described for example in an article by Logan SCOTT "Anti-Spoofing and Authenticated Signal Architectures for Civil Navigation systems" that appeared in the review ION GPS/GNSS 2003, 9-12 Sep. 2003, Portland, Oreg. However, determining the origin and/or the content of the received signals also requires considerable computation means consuming no small amount of power and is therefore not within the scope of a simple user of a radionavigation receiver or of an ordinary user subscribed to digital television programs.

SUMMARY OF THE INVENTION

The subject of the present invention is a method providing the means for recognizing the origin and/or the content of an RF signal without requiring substantial computation means, these recognition means being accessible only to authorized persons and being practically nonmodifiable and very difficult to detect by unauthorized persons, and this being so in various applications using RF signals transmitting information that is at least partly hidden.

The method according to the invention is characterized in that it spreads an item of information to be hidden with the aid of a hidden code, that it distributes this information, with the aid of an XOR function (Exclusive OR), in codes known with the aid of a hidden distribution algorithm, that, on reception, it applies the algorithm that is the inverse of that having served for the distribution in order to gain access to the spread code, that it correlates this spread code with the hidden code in order to find the hidden information. Advantageously, the hidden code is offset at the time of transmission, so that, on reception, when this spread code is correlated with the hidden code that is not offset, the offset is detected. The value of this offset can make it possible to transmit the information.

BRIEF DESCRIPTION OF THE DRAWING

The present invention will be better understood on reading the detailed description of an embodiment, taken as a non-limiting example and illustrated by the appended drawing in which:

the single FIGURE is a simplified block diagram of a device for applying the method of the invention.

DETAILED DESCRIPTION

The invention is described below with reference to the verification of the origin and/or of the content of radiolocation signals (GNSS), but it is well understood that it is not limited to this sole application, and that it can be applied for various RF signals, such as other types of location signals (terrestrial for example) or digital terrestrial television (DTT) signals, in particular pay television, or else pay telephone signals.

An essential feature of the method of the invention is to hide in the spread sequence a digital signature that can be called a watermark. This watermark is hidden so that it cannot be detected directly or with the aid of statistical methods in the spread sequence. Naturally, an authorized user can easily extract this watermark from the spread sequence and use it to determine the source of the received signal.

In the block diagram of the single FIGURE of the drawing, showing a satellite 1 and corresponding receivers 2, only the elements relative to the invention have been shown.

The appropriate circuits of the satellite 1 receive a hidden signature item of information 3 which can be stored on board or transmitted from the ground. This signature is a hidden item of information known only to the organization controlling the satellite and to users authorized to know it (for example the subscribers to a paid-for service transmitted by the satellite 1). The signature 3 comprises a long sequence, preferably of a hundred or so bits at least, which makes it possible to recognize the origin and/or the content of the radiolocation signals and is advantageously modifiable dynamically from the ground with the aid of encrypted messages by sending either a new sequence, or a new seed in order to generate a new sequence, or an order to change signature amongst those stored on board. A hidden spread code (watermark) 4 is "modulated" (5) by this signature (3). This modulation consists in spreading the watermark throughout the sequence of the signature 3. This gives a modulated watermark 6. This spread code 4 is a private code which can also be modified dynamically from the ground as described above for the signature 3.

Then (in a manner that is difficult to detect, as specified below) a portion of a public code 7 is modified, which is in this instance a conventional navigation spread code, with the aid of a technique making use of the modulated watermark 6 and with an "Exclusive OR" function 8 (also called "XOR"). This modification consists in dynamically inverting certain elements ("chips") of the code 7, that is to say that this modification is made gradually as the code 6 runs, the code 7 being presented to the various cells of the function 8 on each sequence of the modulated watermark 6, the location of these elements within the public code being determined by an algorithm 9 which uses private keys. These elements are chosen by the algorithm in a pseudo-random manner and form a small portion of the public code 7, advantageously a few percent of this code, in order to make the modifications of this code 7 very difficult to detect and in order to degrade in a minimal manner the correlation of the public code 7. Since the modulated code 6 has a greater length than that of the code 7 and modifies only a small portion of the latter, the XOR function 8 uses several cells each performing in real time the XOR operation on the code 7 which is presented to each of them.

The navigation code thus hidden is broadcast (11) by the transmitter (not shown) of the satellite 1. It is processed according to operations that are the inverse of those that have been used in transmission in a radionavigation receiver 2, in the following manner. The receive circuits (not shown) of the receiver 2 transmit the signals received from the satellite 1 to an entity 12 which dynamically selects with the aid of the public key 13 the location of the chips in which the "Exclusive OR" (XOR) operation 8 has been performed.

Moreover, the key 13 makes it possible to generate the spread hidden watermark code 14 (identical to the code 4). This code 14 is sent to a correlator 15 which receives from the entity 12 sequences of codes in which the chips of the code 7 modified on transmission have been returned to their original values. At the output of the correlator 15, if the spread code 14 is effectively present in the received signal, the symbols (16) are obtained which must make it possible to reconstitute the signature 17 after decoding, which must be identical to the signature 3 if the information received from the satellite 1 is indeed that transmitted by the organization controlling the satellite, and not a spoof.

In conclusion, the use of the method of the invention is "transparent" for the user who does not need the services (usually paid-for services) protected by this method. The marking carried out by this method is very difficult to detect because the transmitted code (10) thus modified is virtually unaltered and the navigation spread public code (7) is not modified.

Moreover, even if malicious persons used very considerable means to simulate this marking, they would be obliged to use a very high gain antenna in order to detect the modified chips, because, without it, it is impossible to modulate the navigation signals with the modified chips. It would be possible only to defer the transmission of the spoofs in order to have the time to extract each chip and to analyze it, but then the verification of the Doppler consistency of these signals can be easily carried out. An informed user can verify the consistency of the received signals (in Doppler and distance and the ephemeride values). Because the value of the modified chips also depends on the transmitted data, even if it is possible for malicious persons to detect modified chips, it is impossible for them to insert spoofs because they cannot determine the locations in which they must modify the chips because if they wish to transmit the value opposite to the value transmitted by the real system, they know only the location of the chips that are not to be modified.

The invention claimed is:

1. A method of recognizing an origin and/or a content of an RF signal, wherein the method comprising:
    Spreading, using a circuit of a satellite, an item of information to be hidden with an aid of a hidden code,
    distributing, using the circuit of the satellite with an aid of an "Exclusive OR" function the item of information thus obtaining known codes with the aid of a hidden distribution algorithm,
    on reception, applying, using the circuit of the satellite, an algorithm that is an inverse of that having served for the distributing step in order to gain access to a spread code, and
    correlating, using the circuit of the satellite, the spread code with the hidden code in order to find a hidden information.

2. The method as claimed in claim 1, wherein the hidden code is offset in time on transmission.

3. The method as claimed in claim 2, wherein, on reception, when the spread code is correlated with the hidden code that is not offset, the offset is detected.

4. The method as claimed in claim 2, wherein the offset is used for transmitting the item of information.

5. The method as claimed in claim 1, wherein the RF signal is a radiolocation signal of a constellation of satellites.

6. The method as claimed in claim 5, wherein the item of information to be hidden is stored on board the satellites.

7. The method as claimed in claim 5, wherein the item of information to be hidden is transmitted from the ground to the satellites.

8. The method as claimed in claim 1, wherein the item of information to be hidden, which is a long bit sequence, is modified dynamically from ground with an aid of encrypted messages.

9. The method as claimed in claim 8, wherein the item of information to be hidden is modified by transmission of a new sequence.

10. The method as claimed in claim 8, wherein the item of information to be hidden is modified by transmission of a new seed in order to generate a new sequence.

11. The method as claimed in claim 6, wherein stored on board are several items of information to be hidden and that a change order is transmitted in order to select one of those stored on board.

12. The method as claimed in claim 5, wherein the hidden spread code is modified dynamically from ground with an aid of encrypted messages.

13. The method as claimed in claim 12, wherein the hidden code, which is a long bit sequence, is modified by transmission of a new sequence.

14. The method as claimed in claim 12, wherein the hidden code is modified by transmission of a new seed in order to generate a new sequence.

15. The method as claimed in claim 12, wherein stored on board are several hidden codes and that a change order is transmitted in order to select one of those stored on board.

* * * * *